April 30, 1957
L. ROBINSON
2,790,514
ANTI-SKID APPARATUS FOR VEHICLES
Filed March 12, 1956
3 Sheets-Sheet 2
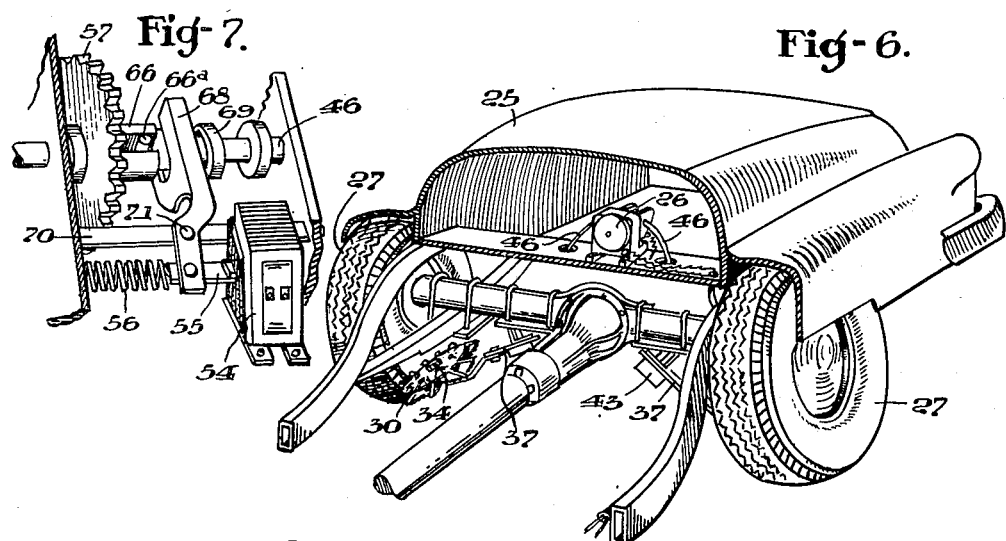
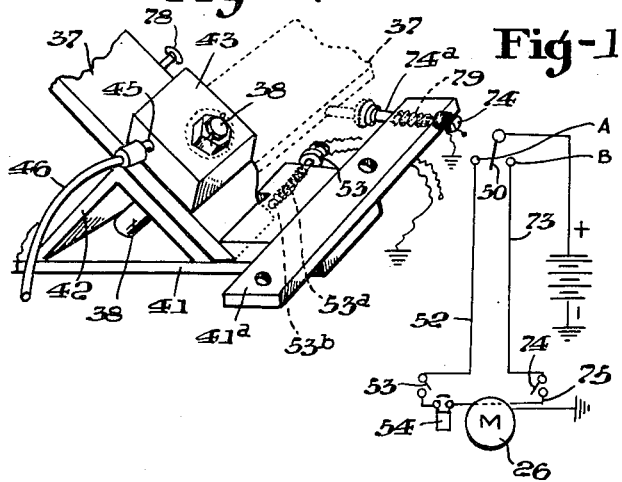
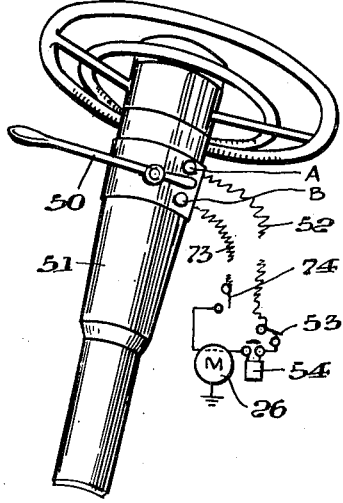
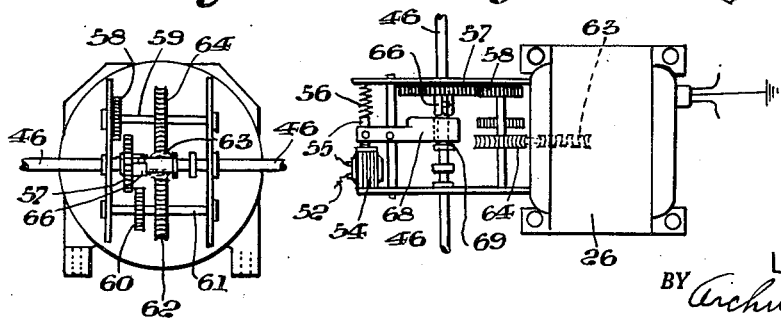
INVENTOR.
LUTHER ROBINSON
BY Archworth Martin
his ATTORNEY April 30, 1957  L. ROBINSON  2,790,514
ANTI-SKID APPARATUS FOR VEHICLES
Filed March 12, 1956  3 Sheets-Sheet 3
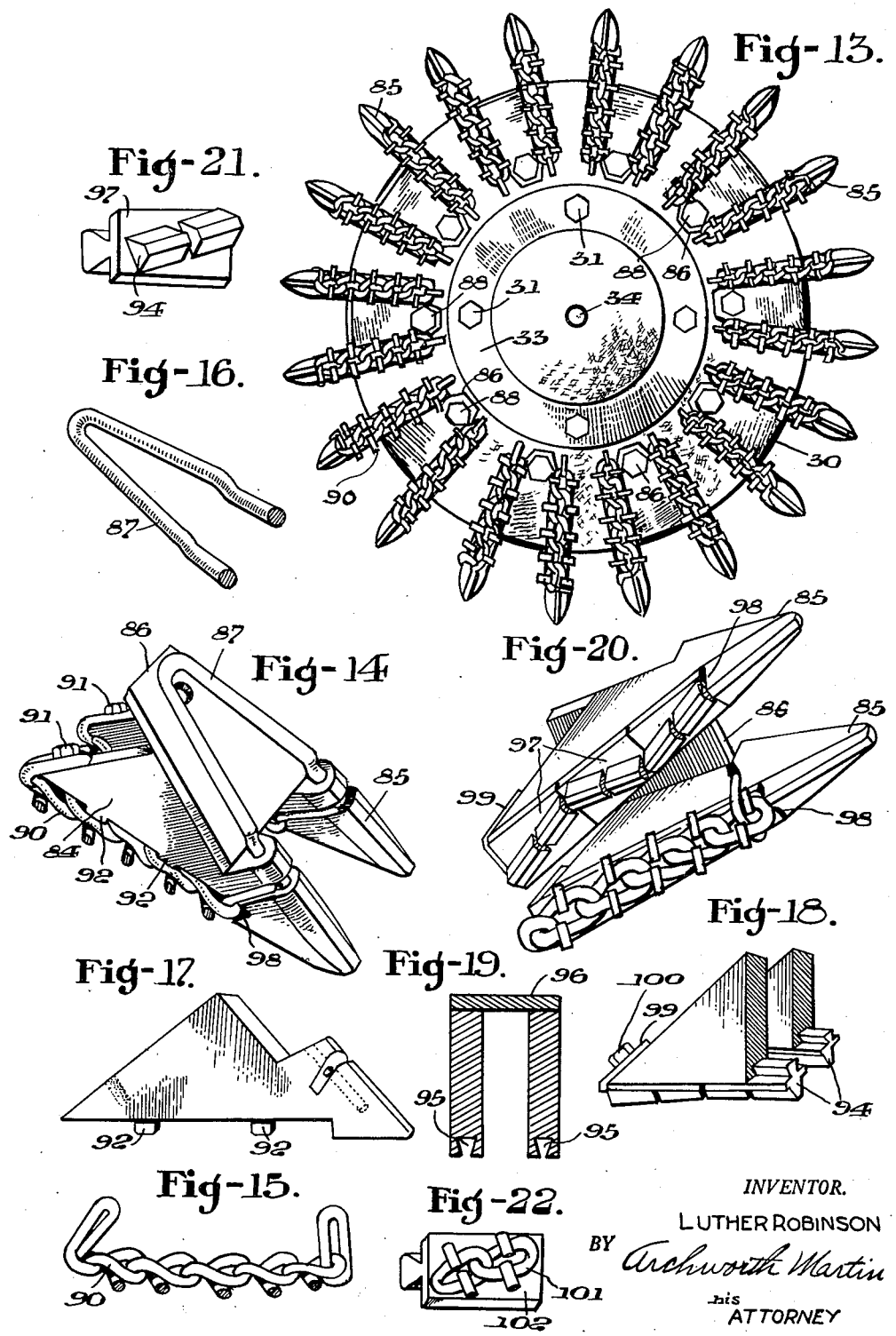
INVENTOR.
LUTHER ROBINSON
BY Archworth Martin
his ATTORNEY

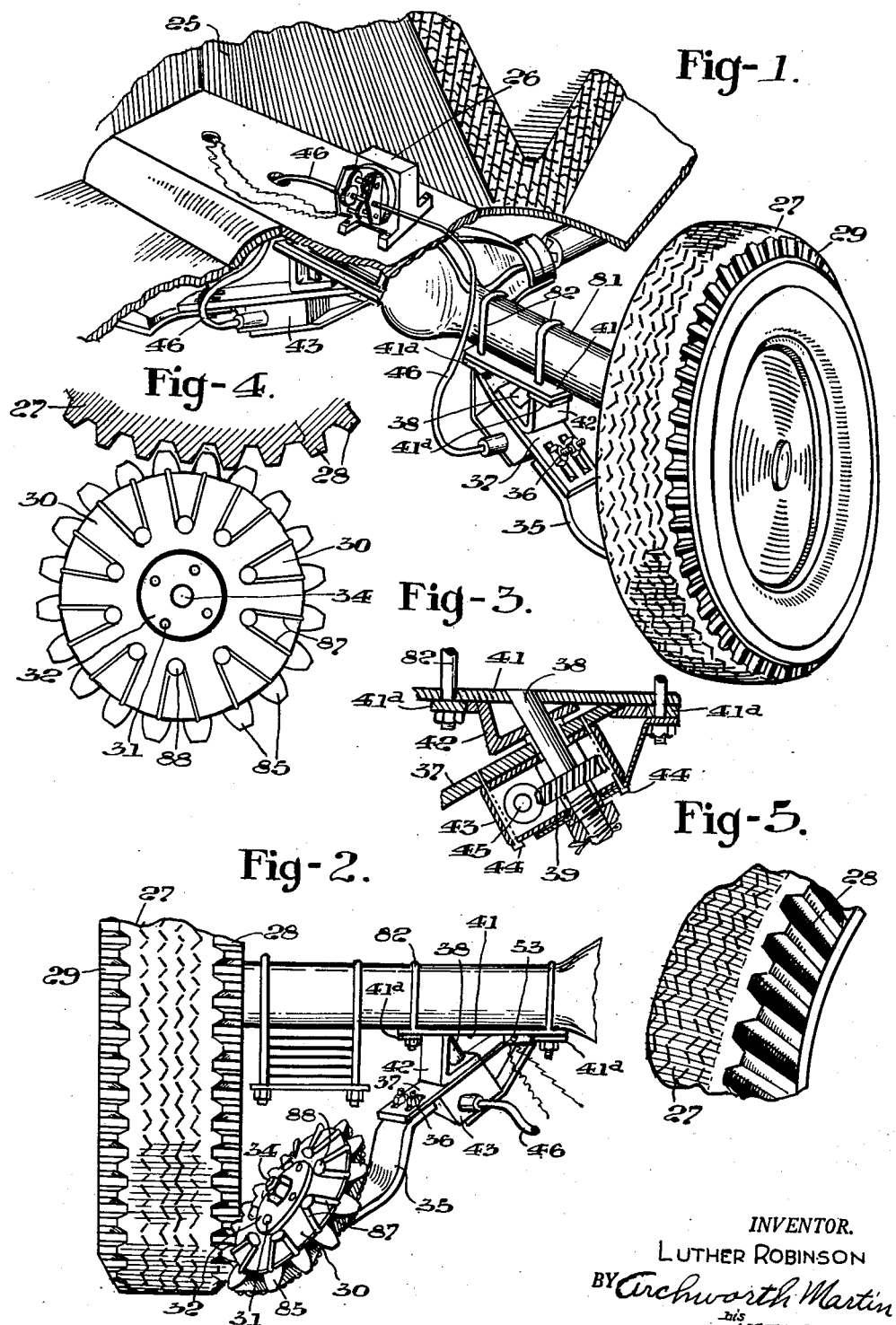

United States Patent Office 2,790,514
Patented Apr. 30, 1957

2,790,514

ANTI-SKID APPARATUS FOR VEHICLES

Luther Robinson, Pittsburgh, Pa.

Application March 12, 1956, Serial No. 570,972

8 Claims. (Cl. 188—4)

My invention relates to anti-skid apparatus, and more particularly to those for use with the tires on the rear wheels of motor vehicles, to prevent slipping and skidding thereof, and constitutes a modification of, and in some respects an improvement upon my application Serial No. 544,448, filed November 2, 1955, now Patent No. 2,780,315.

One object of my invention is to provide an anti-skid device of the rotatable disc type which, although not engaged directly between the tire tread and the road surface, it is effectively driven to effect rotation thereof and to bring anti-skid elements on the underside of the disc directly into engagement with the roadway; this without the objectionable features present in those disc-type devices that extend far beneath the tread surface of the tire, and take substantially all of the wheel load.

Another object of my invention is to provide anti-skid elements and means for connecting them to the rotatable disc, of such form that they can readily be replaced, when worn, and which can easily be moved into and out of operation during traveling movement of the vehicle.

Still another object of my invention is to provide an anti-skid device of the character referred to of such form that while it does not extend between the tread surface of a tire and the roadway and therefore is not fully subject to any substantial part of the vehicle load, it nevertheless, has extended bearing area on the road surface.

Some of the forms which my invention may take are shown in the accompanying drawings, wherein Figure 1 is a fragmentary perspective view showing certain of the mechanism for moving my anti-skid devices into and out of operative position on a road surface;

Fig. 2 is a rear end elevational view of a portion of a vehicle to which the anti-skid device is applied, in its operative position;

Fig. 3 is a sectional view, on an enlarged scale, of gearing which will swing the anti-skid disc toward and from operative position on a road surface;

Fig. 4 is an enlarged fragmentary view of the toothed drive connection between the tire and the anti-skid disc;

Fig. 5 is a fragmentary enlarged view of a portion of the tire of Figs. 1 and 2;

Fig. 6 is a fragmentary front view of the apparatus of Figs. 1 and 2;

Fig. 7 is an enlarged view of a portion of the reversing gear arrangement that is employed to swing the anti-friction discs to their upper and lower positions;

Fig. 8 is an inverted plan view, on an enlarged scale, of the mounting for one of the disc-carrying arms of Figs. 1 and 2;

Fig. 9 is an elevational view of another portion of the reversing mechanism, on a reduced scale;

Fig. 10 is a plan view thereof, including the motor for driving the gearing and the magnet for shifting the reversing gears;

Fig. 11 is a wiring diagram of the electrical control apparatus for moving the anti-skid discs to and from the roadway;

Fig. 12 is a schematic showing of a manner in which the circuits of Fig. 11 are controlled by a switch on the steering column;

Fig. 13 is an enlarged inverted plan view of one of the discs with the anti-skid elements applied thereto;

Fig. 14 shows one of the blocks for connecting the anti-skid chains of Fig. 13 to the disc;

Fig. 15 is one of the chains of Figs. 13 and 14 disassembled from the block of Fig. 14;

Fig. 16 shows the retaining clip of Fig. 14;

Fig. 17 is similar to Fig. 14, but shows a block for holding only a single chain instead of a pair of chains;

Fig. 18 is a fragmentary perspective view showing a modification of the structure of Fig. 14, wherein bar-like calks are substituted for the chains;

Fig. 19 is a cross sectional view of the structure of Fig. 18;

Fig. 20 shows a manner in which the calks and chains of Figs. 14 and 18 can be combined on a single block;

Fig. 21 is an enlarged view showing one of the bar-like calks of Fig. 20, and

Fig. 22 shows the use of chain links instead of the triangular bars of Fig. 21.

In Figs. 1 and 6, the numeral 25 indicates the trunk space of an automobile in which an electrically-driven motor 26 may be conveniently mounted although such motor could easily be placed at some other location.

The vehicle is equipped with the usual drive wheels 27 which are here shown as having tooth-like projections 28 and 29, one series of which, as hereinafter explained, will preferably function as bevel gear teeth for driving the anti-skid discs, particularly in the case of trucks and heavy automobiles. It will be understood that one of the anti-skid devices will be provided at each driven wheel.

The body of the disc 30 is preferably of reinforced rubber so that it will have some flexibility which will allow tilting or flexure when uneven surfaces or small obstructions are encountered on a roadway. The disc is composed preferably of a plurality of layers of rubber, held together by bolts 31 that extend through a clamping plate 32 on the upper surface of the disc and a clamping ring 33 on the undersurface thereof. A bolt 34 extends through the disc 30 and plate 32, and serves as an axis or shaft for rotation of the disc.

An arm 35 supports the bolt 34 and has bolts 36 by which it is adjustably connected to a bracket arm 37. The bracket arm is, in turn, pivotally supported by a stud-like shaft 38 that has rigidly secured thereto a worm gear 39. The shaft 38 is rigidly secured to a bracket plate 41 by welding and is additionally braced by an angle 42 which is welded to the bar 41. A worm gear housing 43 is secured to the bracket arm 37 by screws or bolts 44 and will move with the arm 37 when it is swung to lower and raise the anti-friction disc. A worm shaft 45 is journaled in the gear case 43 and is driven by a flexible shaft 46 from the reversible transmission gearing of Figs. 9 and 10, that is, in turn, driven by the motor 26. By reason of the fixed positioning of the worm gear 39, operation of the worm 45 will cause the gear casing 43 and the arm 37 to be swung about the shaft 38 as an axis, thereby swinging also the arm 35 and the disc 30 to its lower or operative position in Fig. 2, and to its raised or inoperative position, upon reversal of the worm.

The circuits A and B through the motor 26 are controlled by a switch lever 50 on the steering column 51. Using circuit A, the switch 50 will complete a circuit through a wire 52, a switch 53 and the motor 26. A solenoid 54 is included in this circuit, to draw a core bar 55 against the tension of a spring 56 to shift a reversing gear 57 from driving engagement with a gear wheel 60, on a countershaft 61, to a gear wheel 58 on a shaft 59 (Fig. 10). This shaft carries a worm gear 64 that is driven by a worm 63 which also drives a worm gear 62 on the shaft 61. The shaft 46 will then be driven from the motor 26, through the worm 63, the gear wheels 64—58 and 57, in one direction.

When the gear wheel 57 is in driving engagement with the gear wheel 60, the drive will be from the worm 63 through the worm gear 62, the gears 60 and 57, to the shaft 46, thus rotating the shafts 46 in the other direction. At this last-named position of the reversing gearing, the shaft 59 and its gear wheels 58 and 64 will idle. Likewise, the shaft 61 will have idle rotation when the gear wheels 57 and 58 are in mesh.

The gear wheel 57 has slide or splined fit with the shaft 46 (Fig. 7) through the medium of a sleeve-like extension 66 on its hub, this member being slotted to receive a stud 66a on the shaft 46. The hub extension 66 projects through a fork arm 68 and has a collar or flange 69 secured thereto for abutting engagement with the arm 68. The arm 68 is pivotally connected to the movable core or armature 55 of the electromagnet 54 and to a supporting bar 70, so that upon movement of the core 55 by its magnet and the spring 56, the arm 68 will be oscillated about the pivot 71.

The spring 56 shifts the gear wheel 57 into driving engagement with the gear wheel 58 when the magnet is deenergized. Upon energization of the magnet through closure of circuit A, the arm 68 will push against the collar 69 to move the gear wheel 57 into driving engagement with the gear wheel 60.

When the switch 50 is operated into position to close the B circuit through a conductor 73, a switch 74, a conductor 75, and the motor 26, the switch 53 being open and the A circuit through the magnet 54 therefore broken, the drive will be through the gear wheels 57 and 58 for rotating the shaft 46 in a direction opposite to that in which it is rotated when the A circuit is closed. The switch lever 50 therefore serves to selectively control the circuits to raise and lower the discs 30.

In order that the motor 36 will be automatically stopped at the upper and lower limits of movement of the discs and their supporting arms, the swinging arm 37 is utilized to operate the switches 53 and 74. Thus when the swinging arms that carry the discs are in their lower positions, as shown in Fig. 2, the arm 37, at its upper end, will open the switch 53 against the pressure of its spring 53a by moving the plunger 53b, while when the arm 37 is in its upper position, knob 78 thereon will engage the switch plunger 74a to open the switch at 74 against the pressure of a spring 79. This last-mentioned movement releases the switch 53 to be closed by its spring 53a, for partial completion of the circuit A preparatory to when the switch 50 is again operated to close the circuit through wire 52.

The anti-skid units are connected to the rear axle housing 81 by U-bolts 82 that extend through bars 41a and the plates 41 to which the supporting brackets 42 are welded.

As stated above, the anti-skid discs are rotatably supported on their arms 35 by the shafts or bolts 34 and have rotative movement when in meshed engagement with the teeth on the tire as shown in Figs. 2 and 4. The tooth members on each disc comprise plates or blocks 84 whose tooth-like projections 85 are of beveled form and mesh with the teeth 28 on that area of the tire intermediate the tread and the side wall thereof. These blocks 84 have plate-like portions 86 welded to the side plates that carry the toothed projections 85. The plates 86 are slid into underlying relation to the disc, and clips 87 carried thereby are inserted into holes in the blocks and overlie the disc. Bolts 88 extend through the webs or plates 86, the disc 30 and the bights in the clips 87, and thereby hold the blocks and their anti-skid elements firmly in position on the disc.

As shown in Figs. 13 and 14, chains 90 that serve as the anti-skid elements are held in place on the lower edges of the blocks by the legs of the clips 87 extending through the outer ends of the links and by cap screws 91 that extend through the inner ends of the links and into the rear edges of the side members and the block. Studs 92 on the lower edges of the blocks prevent displacement of the chains. If desired, a single chain-holding block can be used as shown in Fig. 17, instead of the two-chain block of Fig. 14.

Referring now to Figs. 18 and 19, I show the anti-skid elements as in the form of calks 94 which have dove-tail ribs on their upper ends for telescopic engagement with dove-tail slots 95 in the lower edges of the sides of the block 96. The calk portions of the members 94 have a zig zag arrangement and may be either continuous throughout the length of the slots 95, as shown in Fig. 18, or be broken up into short lengths as shown at 97 in Figs. 20 and 21. In either case, they abut at their outer ends against a shoulder-like area 98 and are releasably held in the slots 95 by a plate 99 that is, in turn, held in place on the block by a cap screw 100.

In Fig. 22, I show a modification of the structure of Fig. 21, wherein chain links 101 are welded to a dove-tailed block 102 that may be substituted for the blocks 97.

As shown in Fig. 20, each block may carry both the calk and the chain type of anti-skid element.

As indicated above, it is important that the anti-friction discs should not be moved beneath the tire tread proper, that is, to such a distance that a substantial part of the wheel load will be imposed thereon. Such a condition would be objectionable on paved roads, because of the excessive amount of grinding action that would occur through the somewhat tangential movement of the anti-skid elements relative to the rotative path of the tire tread, and the consequent "drag" exerted by the calks crosswise of the tire and on the pavement.

For the foregoing reason, the automatic cessation of movement through tripping of the switch 53 by the downwardly-swinging arm 37 is important, since the switch will be so set that the circuit of the motor 26 will be broken the instant the anti-skid disc hits the wheel and the roadway. The worm gear drive at 39—45, in effect, serve as an effective lock for holding the disc in accurate position. If there were further substantial freedom of swinging movement, the disc would be drawn beneath the wheel to probably an undesirable extent, with the above-mentioned resultant disadvantage.

I claim as my invention:

1. A traction device for wheeled vehicles, comprising a tire that has an area that extends in a generally sloping direction from the road-engaging area of the tread to the sidewall of the tire, an anti-skid disc rotatably supported from the vehicle, on an inclined axis, rib-like protuberant elements on the upper surface of the disc and extending radially at the edge thereof, in position to engage said sloping area when the disc is in operative position, plates of generally triangular form on the underside of the disc, with their apices projected into the space between the said sloping area and the roadway, to approximately the line where the road-engaging area of the tire tread and the sloping area meet, the plates being in planes perpendicular to the plane of the disc and projecting radially in circumferentially spaced relation from the edge of the disc, and means for moving the disc into and out of position against the roadway and the tire.

2. A traction device as recited in claim 1, wherein the said sloping area has tooth-like projections that mesh with the upper edges of the plates where they extend from beneath the disc.

3. A traction device as recited in claim 1, wherein calklike elements are replaceably secured to the under edges of the plates.

4. A traction device as recited in claim 1, wherein the means for moving the disc against a roadway comprises a device for limiting its movement to operative position, independently of its engagement with the tire.

5. A traction device as recited in claim 1, wherein the plates are detachably secured to the edges of the disc by clips that overlie the disc and are held in place by bolts through the disc.

6. An anti-skid device as recited in claim 3, wherein the calks are in the form of triangular bars.

7. An anti-skid device as recited in claim 3, wherein the calks are in the form of short triangular bars arranged in non-parallel relation.

8. An anti-skid device as recited in claim 3, wherein the calks are in the form of chain links.

References Cited in the file of this patent

UNITED STATES PATENTS

| | | |
|---|---|---|
| 2,140,606 | Stickles | Dec. 20, 1938 |
| 2,283,948 | Ridgway | May 26, 1942 |
| 2,295,837 | Gerth | Sept. 15, 1942 |
| 2,747,691 | Lakey | May 29, 1956 |
| 2,767,809 | Sutter | Oct. 23, 1956 |
| 2,771,161 | Jesionowski | Nov. 20, 1956 |

FOREIGN PATENTS

| | | |
|---|---|---|
| 25,015 | Great Britain | Nov. 17, 1905 |